(12) United States Patent
Rodriguez et al.

(10) Patent No.: US 6,693,408 B2
(45) Date of Patent: Feb. 17, 2004

(54) ELECTRIC ACCUMULATOR BATTERIES

(75) Inventors: Rafael Ruiz Rodriguez, Madrid (ES); Antonio Ripoll Anton, Madrid (ES); Ernesto Collado Parra, Madrid (ES)

(73) Assignee: S.E. Acumulador Yudor, S.A., Madrid (ES)

( * ) Notice: Subject to any disclaimer, the term of this patent is extended or adjusted under 35 U.S.C. 154(b) by 0 days.

(21) Appl. No.: 10/255,369

(22) Filed: Sep. 26, 2002

(65) Prior Publication Data

US 2003/0059679 A1 Mar. 27, 2003

(51) Int. Cl.⁷ .......................... H01M 10/46; H01M 2/04
(52) U.S. Cl. ......................... 320/112; 429/177
(58) Field of Search ............................. 320/107, 112, 320/116, 120, 147; 429/86, 88, 89, 177

(56) References Cited

U.S. PATENT DOCUMENTS 3,879,227 A * 4/1975 Hennen
6,004,689 A * 12/1999 Walker et al.
2002/0098412 A1  7/2002 Rodriguez et al. .......... 429/149

FOREIGN PATENT DOCUMENTS

| ES | 2087023 | 7/1996 |
| ES | 2134149 | 9/1999 |
| ES | 2166284 | 4/2002 |

* cited by examiner

*Primary Examiner*—Edward H. Tso
(74) *Attorney, Agent, or Firm*—Marshall, Gerstein & Borun LLP

(57) ABSTRACT

An electric accumulator battery, comprising a recipient which is closed by means of a lid composed of a lower lid and an upper lid joined together, delimiting an intermediate chamber. The lower lid has filling holes (15), in which closing stoppers with a gas outlet valve are assembled, which end in the chamber defined between the two lids. The upper lid has openings (10) for the passage of the connection terminals (3), and at least one gas outlet hole (12). The two lids have facing ventilation openings (7–7').

4 Claims, 6 Drawing Sheets

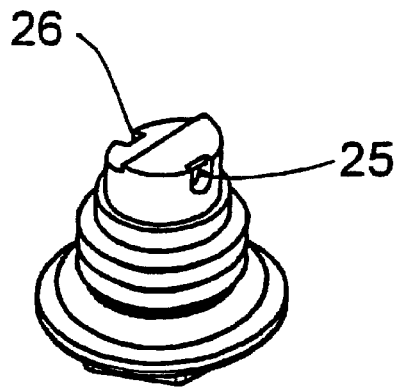
Fig. 7
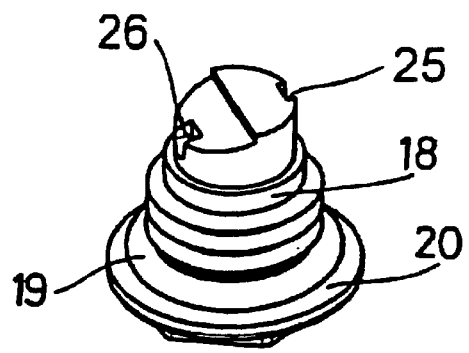
Fig. 8
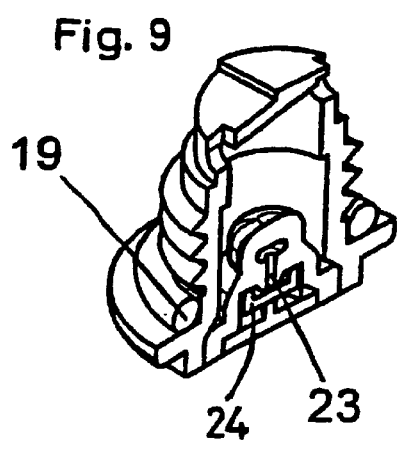
Fig. 9
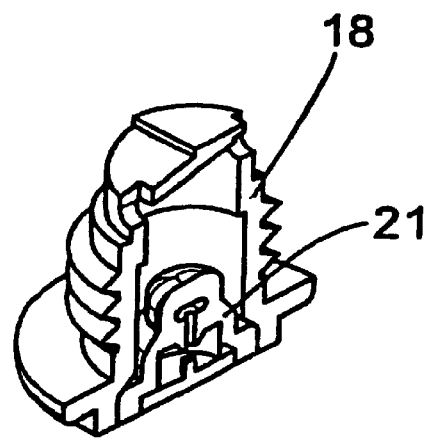
Fig. 10
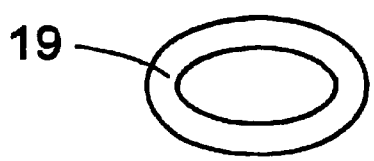

ELECTRIC ACCUMULATOR BATTERIES

FIELD OF THE INVENTION

The present invention refers to a lead-acid type electric accumulator battery which can be used for the traction of electric vehicles, for feeding networks in the stationary service, although it is preferably of those used in the starting, lighting and ignition of vehicles and comprises a recipient internally subdivided into cells in which the positive and negative plates, a separator and electrolyte are housed, the recipient closing by means of a lid through which the current tap terminals protrude and which has openings facing the cells which close by means of stoppers incorporating a valve for controlling the gas outlet.

More specifically, the battery of the invention is applicable to batteries flooded with acid electrolyte, although it is preferably of the gas recombination type.

Even more specifically, the battery of the invention refers to one of the type of bound plates forming a spiral, separated by a micro-fiberglass absorbent retainer.

BACKGROUND OF THE INVENTION

The gas recombination system in lead-acid batteries is known. Spanish patent application numbers 9701689 dated Jul. 30, 1997, 9902310 dated Oct. 20, 1999 and 200001486 dated Jun. 13, 2000 can be cited as examples, in which the progressive advance in this gas recombination technique is disclosed.

In this type of battery, the incorporation of filling materials in the separators is known, such as disclosed in patents ES 2,087,023 and EP 0680105.

The arrangement of regulating valves of the internal pressure of the cells of the battery is also known, as disclosed in patent ES 2134149 and Spanish patent application numbers 9902310 and 200001486.

The art continues to advance in the manufacturing of recombinant lead-acid batteries, such that the manufacturing and use means have been depurated, especially including the means for assisting in the recombination, for the purpose of minimizing the outward release of gases and more importantly, including as priority the safety systems used in order to prevent the effects of a possible outward release of gases, which constitutes the two largest objectives disclosed in the present invention.

It is known that the gas recombinant system in lead-acid batteries consists of introducing into such batteries the means capable of driving the gases generated by the positive plates constituting the battery anodes and that are released towards the negative plates, and that these means be suitable so as to permit and facilitate that these gases can react on the negative electrode surface.

In the general functioning of a lead-acid battery, oxygen gas is released from the anodes or positive plates and hydrogen gas is released from the negative plates. The evolution of these gases is much greater in the charge operation than in that of discharge or in standstill.

The intense production of gases in the plates of a battery being charged occurs in the positive plates before in the negative plates due to the difference of the electrode voltage necessary for the evolution of both gases, oxygen and hydrogen, which serves as a base for achieving the recombination of the oxygen gas released by the positive plates, as long as a means is interposed which efficiently drives it towards the negative plate surface.

The active material of the negative plates of the lead-acid battery is of spongy lead, very oxygen absorbent, with which it reacts initially forming lead oxide, according to the equation:

$$2Pb+O_2=2PbO$$

The lead oxide formed in this manner on the negative plate surface is very unstable since, in the presence of the sulfuric acid integrating the battery electrolyte, it immediately forms the corresponding lead sulfate, according to the equation:

$$PbO+H_2SO_4=PbSO_4+H_2O$$

The lead sulfate is a compound which has the feature of reducing the voltage of the negative plates electrode in direct proportion to the content and therefore slows or prevents the release of hydrogen while these plates charge.

It is for the reasons above that the recombination of gases inside the cells of the battery functions, but it must be understood that the entire recombinant system depends on two important technical grounds:

The first of the two important technical grounds is that the oxygen must be driven from the positive plates to the surface of the negative plates, due to which suitable means must be used, generally special separators and/or electrolytes which open canals or conduits through which the circulation of the oxygen in its movement between plates is propitiated or facilitated.

The second technical ground is that the internal pressure generated in the cell by the gases or fumes released inside must be regulated so as to permit the outward escape of any possible excess of pressure of the gases or fumes, but at the same time constantly preventing the entrance of atmospheric air inside the cells, since the oxygen of the entering air would react with the negative active material and would deteriorate the recombinant system.

In reference to the first technical ground, the battery of the invention can incorporate different means tending to immobilize the electrolyte and to canalize the oxygen and direct it towards the negative plates; the electrolyte immobilization is essential in recombinant batteries as it facilitates the passage of gases through it and moreover, the "clean" or ecological objective is achieved because no acid would be leaked even if a battery should break; a different way to achieve the electrolyte immobilization is that of making it solid, forming a gel, although in the battery of the invention, which is preferably of the helical plates type, an element is incorporated which adapts to such spiral, serving as a plate separator, which in turn is an electrolyte immobilization means by absorbing this electrolyte in the pores of the separator means, which at the same time is an ideal oxygen carrying means, and which is basically a micro-fiberglass mattress mixed with a percentage of plastic micro-fibers whose total content can range between 10 and 50%.

It has been observed that the higher the percentage of plastic fibers contained in the material of the micro-fiberglass separator, the greater the physical resistance of the separator against breaking by traction and/or piercing, achieving with this a better separator effect between the electrodes or plates of a different sign, which should never touch for the purpose of preventing the short circuit between them.

It has also been observed that the ease of the passage of oxygen from the positive plates towards the negative ones is aided by the decrease of the percentage of plastic fibers in the separator material to limits being those previously indicated, from 10 to 50%, values which depend not only on the rated thickness of the separator, but especially on the compression coefficient to which the assembly of the elements integrated by the cells are subjected to.

It has also been observed that the micro-fibers composing the separator must not be entwined in the orthodox manner, that is to say fiber bundles aligned in parallel lines and perpendicularly crossing them with other bundles, but rather they must be freely mixed, without forming bundles and mixing between them, such that the sulfuric acid is immobile by being absorbed in such fibers and especially the microscopic gas bubbles find capillary paths whose winding feature precisely aids in its passing through thereof.

Lastly, it has been observed that a direct relationship exists between the dimension of the micro-fibers and the maximum dimension of the pores formed in the separator, such that a smaller maximum pore diameter corresponds to a shorter fiber length; this fact is of vital importance in recombinant batteries, as the tendency of forming lead sulfate depositions is known in pores of greater than 22 microns in diameter, depositions that can be transformed into lead dendrites when charging the batteries and that could electrically connect the consecutive plates, producing what is generally called a micro-short circuit, ruining the battery functioning.

On the other hand, the fact of incorporating filling materials in the separators is known, as can be seen in patents ES 2,087,023 and EP 0680,105; these fillings are usually of a material derived from silicon, ground into microscopic sized particles, which are added in proportions from less than 0.01% up to more than 1% with respect to the total weight of the separator and that have the main advantage of ensuring the equality of the size of the pores of the separator, such that the ease of the passage of the ions carrying the electric current is optimized while at the same time it matches with the impossibility of forming the lead dendrites which cause the micro-short circuit between plates of a different sign.

In reference to the second technical ground, the battery of the invention incorporates a new system of regulating the individual internal pressure in each cell, which consists of making the hypothetical exiting gases of each cell pass through a stopper, which is provided with a resilient valve, such that this valve is housed within the body of the stopper and permits the gas outlet and therefore prevents the entrance of air inside of the cells with safety margins far superior to those of the previously used regulating valves; the type of regulating valve of the internal pressure of the cell is known, as can be seen in the description in Spanish patents 2,134,149 from 1997, 9902310 from 1999 and 200001486 from 2000; in all cases, the resilient valve opens, becoming deformed when the internal pressure exceeds a certain value, permitting the gas to exit until achieving the internal pressure that is no longer sufficient for the resilient deformation of the material of the valve, the latter closing and therefore preventing the entrance of air from the atmosphere towards the inside the cell; effectively, the valve incorporated by the battery of the invention has a similar functioning to the one disclosed in said patents, but the configuration of the stopper housing it and its location in it ensure its maximum function reliability; as an example, it is enough to say that the standard valves, defined in the previously mentioned patents, have a field of actuation which permits the gas outlet (opening pressure) when the difference of the internal pressure with respect to that outside is of 0.3 atmospheres, and prevents the gas outlet (closing pressure) when the difference of the internal pressure with respect to that outside is of 0.05 atmospheres, that is to say that there is a difference of pressure between opening and closing of 0.25 atmospheres; the new valve incorporated by the battery of the invention permits the outward passage of gas (opening pressure) when the difference of internal pressure with respect to that outside is of 0.1 atmospheres, and prevents the gas outlet (closing pressure) when the difference of internal pressure with respect to that outside is of 0.08 atmospheres, which implies that the difference of pressure between that of opening and that of closing is reduced to only 0.02 atmospheres or 8% of the difference of pressures of the previous valve, which strongly increases the functioning safety; the incorporation of the new stopper with the incorporated valve permits affirming that the safety of the battery of the invention is far greater than the safety of the previous batteries.

It can be affirmed that the incorporation of the new stopper with the incorporated valve significantly contributes to the definitive solution of the irregular heating problem of the batteries; on the other hand, the battery of the invention is provided with refrigeration conduits between the central cells so that the heating of each cell causes equal temperatures in each cell.

It is known that, in the case of automobile starter batteries, in the majority of vehicles, the battery is placed in the engine bay, being exposed to the heat radiation of the engine; generally, there is an area of the battery that heats more than the rest, causing a greater temperature increase in some cells than in others.

It is known that the voltage generated in a battery cell is higher when either of both parameters is higher: a) the electric charge current running through it and b) the temperature of the components of the cell.

During the charge operation, a constantly invariable electric current runs through the battery, since it is the same current which runs through each cell because the construction of the standard battery is that which has all of its cells connected in series; by the first principle of electricity, it is known that the charge current circulating through a battery generates a voltage that is proportional to the magnitude of that current; but if any of the cells were at a higher temperature than any other one, the higher its temperature is, the higher the generated voltage in that cell would be, since, as previously indicated, upon circulating through the cells in series, the charge current generating the voltage is the same one for all the cells. The battery of the invention eliminates or at least minimizes the differenced heating effect between cells, applying the already known means disclosed in the three previously mentioned patents, consisting of vertical tubes passing from the lid to bottom of the battery by means of which the passage of air or other coolant is permitted in the inner cells of the battery, which contributes to a homogenous distribution of the heat radiated by the automobile engines or other heat sources, making that the temperature reached in each cell of the battery be practically the same.

In the same manner, if a standard battery were charged at a constant voltage (as is the case in recharging the automobile battery), that is to say with the cells connected in series, the higher the temperature of the battery cells, the higher the circulating current would be.

The Faraday effect is known, due to which the value of the quantity of overcharge electricity, current×time, is directly related to the gasification, such that 96500 amperes×second would break 18/2=9 grams of water for each cell, which would mean that for each ampere-hour of overcharge electricity in the batteries, approximately 0.34 grams of hydrogen and oxygen gases per cell should be lost; being standard, 6 cell batteries, the theoretical weight loss a 6 cell battery should experiment would be of about 2 grams for each ampere-hour of electric overcharge; thus, the bigger the current is, the greater the weight loss should be.

On the other hand, it is known that the massive evolution or release of oxygen and hydrogen from the plates of the batteries when they overcharge causes the loss of electrolyte water, which becomes concentrated in sulfuric acid and in turn reduces its volume, such that it can reach a point in which there is not enough liquid to cover the surface to the plates, and both effects, that of the high concentration and that of the lack of covering the surface of the plates, will initially cause the gradual performance reduction and lastly, the destruction of the batteries.

It is also known that the evolution of gases and fumes, more specifically the evaporation of the electrolyte water, and the massive release of oxygen from the positive plates and hydrogen from the negative plates during the charge operation, is directly proportional to the voltage of such charge to which said plates are subjected and that this voltage generated between the battery plates is also directly related to the temperature thereof; therefore, if one cell is at a higher temperature than the rest of the battery cells, the gas and fumes outlet of that hotter cell is much higher than the gases and fumes outlet of the rest of the cells, and there lies the importance of the innovation disclosed in the three previously mentioned patents, and which is incorporated in the battery of the invention, due to which a large homogenization of the temperatures of the different cells constituting the battery is achieved.

It is also known that during the battery charge operation, the massive outlet of gases is totally or partially prevented in recombinant batteries due to the previously explained reasons, that is to say because the oxygen released from the positive plates is driven towards the surface of the negative plates and there it reacts with the lead constituting the negative active material, reducing the negative electrode voltage and thus preventing the generation of hydrogen; the efficiency in recombining the gases generated in recombinant batteries can be measured and its measurement will give an idea of the quality of such batteries.

In the battery of the invention, for the purpose of the recipient offering the most uniform upper surface possible, practically flat, and at the same time achieving driving the possible released gases towards a single outlet hole, the lid closing the recipient is double, composed of an upper lid and a lower one, joined together, between which an intermediate chamber is delimited.

The lower lid is hermetically joined to the wall and partitions of the recipient and the current outlet connections pass through it hermetically, which are joined by means of connectors to the corresponding post, which will pass through the upper lid. The lower lid also has a hole facing each cell, which will be closed by means of a stopper carrying the gas outlet valve, a stopper that ends in the chamber defined between the two lids. This lid also has openings facing the recipient ventilation canals.

The upper lid has openings for the passage of the current tap terminals, ventilation openings facing the ventilation openings of the lower lid, as well as a hole for the gas outlet.

In order to show the affirmations of the previous paragraphs, the following examples are given:

EXAMPLE 1 a sample of five 12 volt rating 50 ampere-hour batteries, constructed with the technology of spiral bound plates and of the valve regulated gas recombination system, completely according to the present invention, was subjected to a test consisting of continuously overcharging completely charged batteries and each battery stabilized at a different temperature for 1000 hours with a constant voltage of 14.2 volts; the first of them charged at 25° C., the second at 40° C., the third at 50° C., the fourth at 60° C. and the fifth battery charged at 75° C.; the temperatures were kept constant for the entire test; prior to the test, the batteries were weighed for the purpose of calculating the quantity of lost gases and fumes; during the entire test, the intensity values of the electric current circulating through each battery in every hour of the test were also recorded.

When the 1000 overcharge hours of the test elapsed, the values of the current circulating through each one of the batteries were integrated and these were weighed to check the real weight loss experimented by each battery.

The battery that was overcharged for 1000 hours at 14.2 volts and at 25° C. was traversed by an 86 ampere-hour electricity quantity and experimented a weight loss of only 6 grams; as by the Faraday law it should have lost approximately 172 grams of weight, the recombination of the battery of the invention in those conditions resulted to be 96.5% efficient; the calculation of the recombination efficiency is carried out by establishing that if the 172 grams had recombined, that is to say if there had been no weight loss, the recombination would have been 100% efficient, but as in reality a total of 172−6 grams were recombined, the efficiency is therefore (172−6)×100/172.

The battery that was overcharged for 1000 hours at 14.2 volts and at 40° C. was traversed by a 127 ampere-hour electricity quantity and experimented a weight loss of only 14 grams; as by the Faraday law it should have lost approximately 254 grams of weight, the recombination of the battery of the invention in those conditions resulted to be 94.5% efficient.

The battery that was overcharged for 1000 hours at 14.2 volts and at 50° C. was traversed by a 190 ampere-hour electricity quantity and experimented a weight loss of only 36 grams; as by the Faraday law it should have lost approximately 380 grams of weight, the recombination of the battery of the invention in those conditions resulted to be 90.6% efficient.

The battery that was overcharged for 1000 hours at 14.2 volts and at 60° C. was traversed by a 280 ampere-hour electricity quantity and experimented a weight loss of only 87 grams; as by the Faraday law it should have lost approximately 560 grams of weight, the recombination of the battery of the invention in those conditions resulted to be 84.6% efficient.

The battery that was overcharged for 1000 hours at 14.2 volts and at 75° C. was traversed by a 430 ampere-hour electricity quantity and experimented a weight loss of only 218 grams; as by the Faraday law it should have lost approximately 860 grams of weight, the recombination of the battery of the invention in those conditions resulted to be 74.8% efficient.

On the other hand, charging or recharging the batteries with an overvoltage inversely proportional to the temperature of the battery and its surroundings constitutes a general standard, such that they offset the temperature increase by applying a lesser recharge voltage; in the automobile sector, charge voltage regulators are generally used, which function with an adjustment which generally ranges from −0.007 volts/° C. to −0.01 volts/° C., starting from a nominal value generally ranging from 14 to 14.2 volts at 20° C.; this thermal adjustment achieves that these batteries are in the threshold of 100% recombination efficiency, as shown in the following example:

EXAMPLE 2

A 12 volt 50 amperes-hour battery, like those from the previous example, therefore constructed according to the present invention, was weighed, it was maintained at a constant temperature of 75° C. and was recharged for 1000 hours always at this temperature at a voltage of 13.85 volts; this voltage would be the equivalent of charging with a voltage of 14.2 volts at 25° C., with a thermal adjustment of −7 milivolts per centigrade degree; when the overcharging was finished, the quantity of electricity that had charged the battery resulting to be 130 amperes-hour was integrated; then the battery was weighed again, a weight difference of only 18 grams being obtained, which implies a 93.1% recombination efficiency.

The features and advantages of the battery of the invention can be better understood with the following description made with reference to the attached drawings, showing a non-limiting embodiment example.

BRIEF DESCRIPTION OF THE DRAWINGS

In the drawings:

FIGS. 7 and 8 show perspective sectional views of the stopper with valve for closing the hole of the cells.

FIG. 9 shows a sectional view similar to FIG. 6.

FIG. 10 shows a sectional view similar to FIG. 9, with the disassembled toroidal gasket and valve.

DETAILED DESCRIPTION OF PREFERRED EMBODIMENTS

Figure 1:
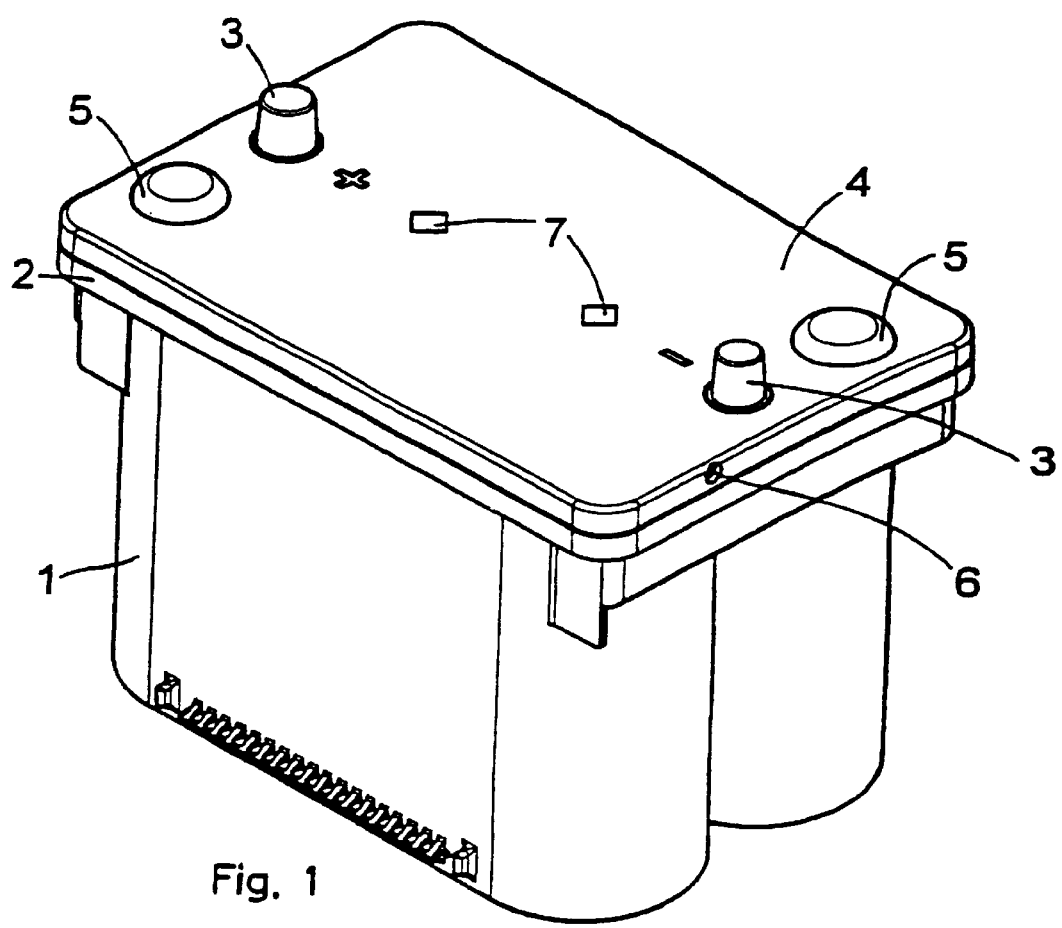
FIG. 1 shows a perspective view of a battery according to the invention.

The battery of the invention has the final appearance shown FIG. 1, in which number 1 shows the recipient or box containing the six cells or elements; each cell is a cylinder where the plates are spirally wound; the battery recipient shown here has a prismatic shape and adapts to the standardized dimensions for its use in starting automobiles; number 2 shows the battery lid which in this case is double, as will be described below; number 3 shows the external connection terminals or poles of the battery; number 4 shows the outer lid of the battery; number 5 shows the two protrusions which will cover the internal connection outlets, as will be explained below; number 6 shows the outward gas outlet hole of the battery, and number 7 shows the two ventilation openings permitting the refrigeration equality of each battery cell, with openings 7 for the purpose of maintaining them at the same temperature.

Figure 2:
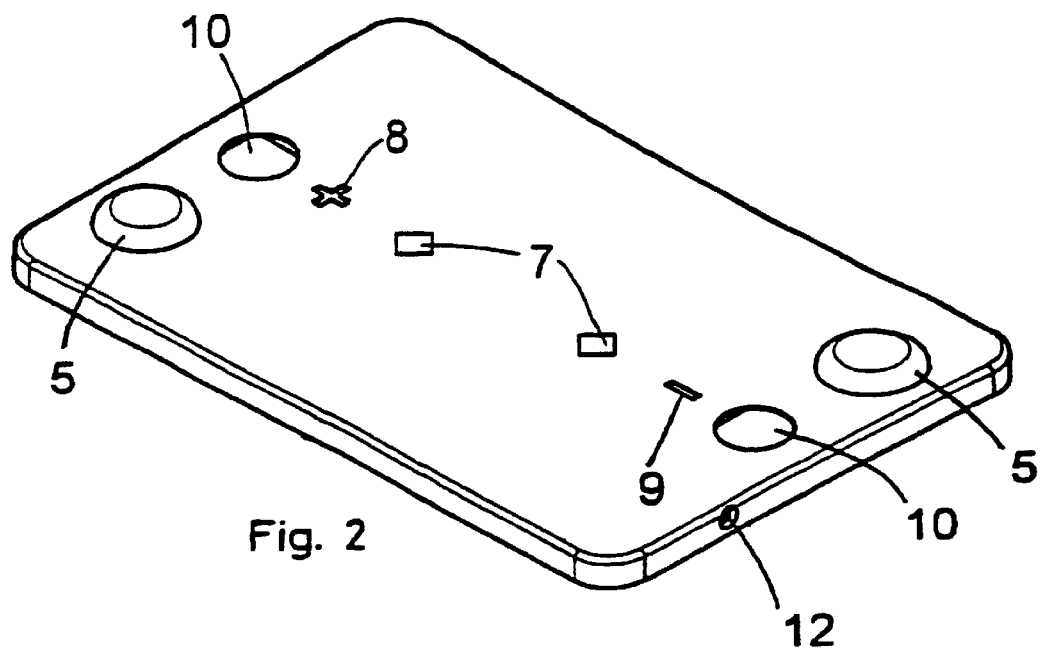
FIG. 2 shows a perspective view of the upper lid.

FIG. 2 shows the upper part of the outer lid of the battery with the openings 7, number 8 showing the sign corresponding to the positive polarity and number 9 that of the negative, for the purpose of preventing connection errors in the vehicle; number 10 shows the holes through which the battery terminals or poles will emerge; lastly, number 12 shows the outward gas outlet hole of the battery, to which a bend with a tube can be adapted in order to direct the gases towards the outside of the vehicle, so that the battery can be located in the driver's area without risks of releasing gases inside the driver's area.

Figure 3:
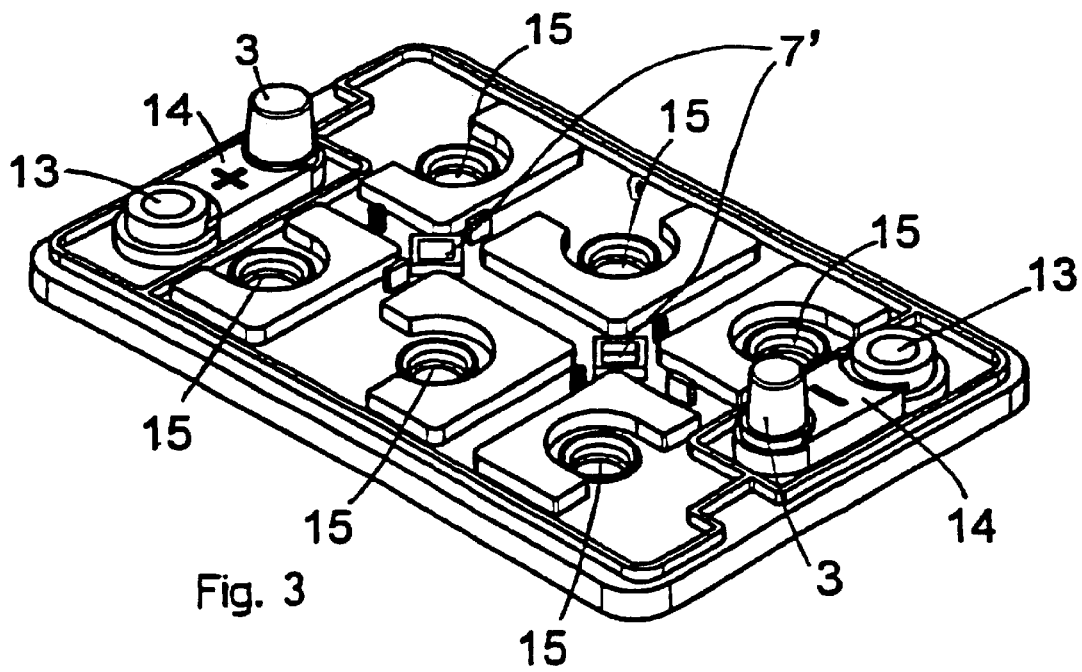
FIGS. 3 and 4 show upper and lower perspective views, respectively, of the lower lid.

FIG. 3 shows the first lid or inner lid of the battery of the invention; number 13 shows the current outlet connections from the inside towards the outside of the battery; these connections must protrude from the lid like a protrusion and are those which are to be covered by the two protrusions indicated with number 5 in FIGS. 1 and 2; number 14 shows the plastic parts covering the lead connectors going from the connections 13 to the terminals or poles 3; number 15 shows the six holes through which the cells are filled with electrolyte for their formation or first charge and that after will serve as an outlet conduit of the possible gases released from each cell; these holes are threaded so that each one of them can be closed with a special stopper, which will be described below; number 7' shows ventilation openings facing the openings of the outer lid also marked with number 7, which are surrounded by a wall that will be sealed against the outer lid, around the facing openings 7, such that the entire inside of the battery remains hermetically sealed, except the refrigeration canals with outlet through the holes marked with 7 and the gas outlet marked with 12.

Figure 4:
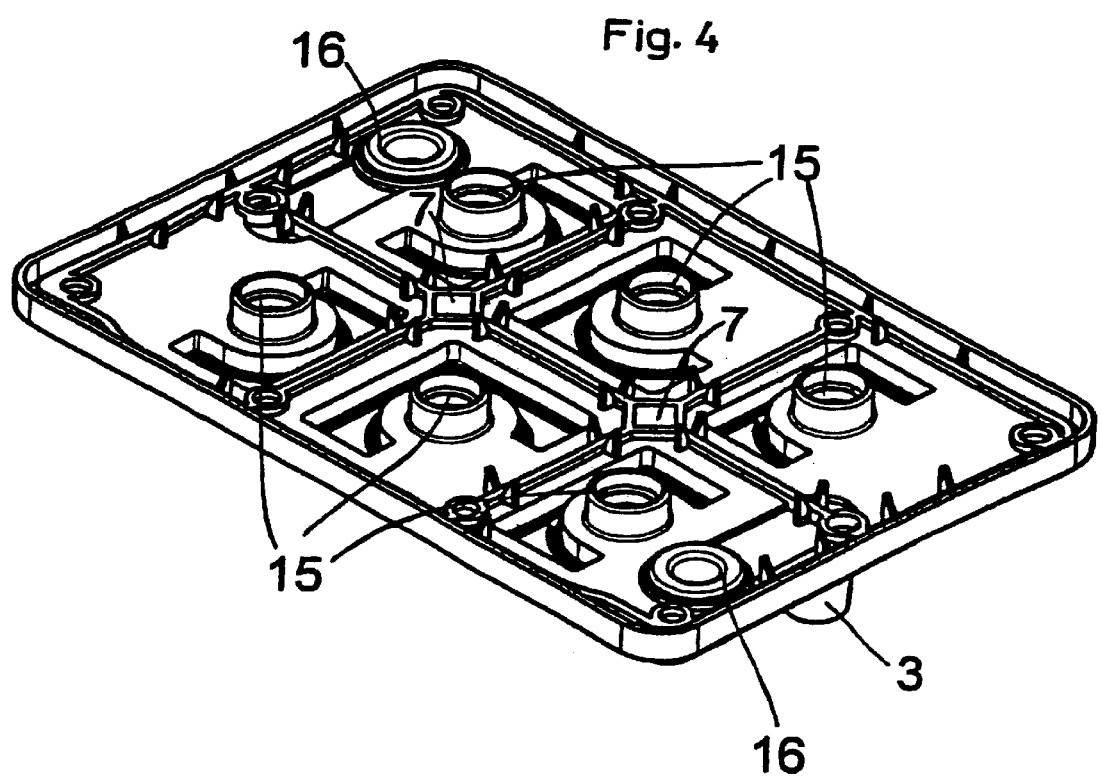

FIG. 4 shows the same inner lid as that in FIG. 3, but now the view is from below; the filling and gas outlet holes, marked with number 15, have been extended in order to make the closure of the screw stoppers, which will be described below, more reliable; number 16 shows the lead bushings serving so as to make the welding marked with number 13 in FIG. 3; these bushings are already edged or bordered, that is to say that the edge of the lead bushing is worked in order to achieve a hermetically sealed closure with the plastic of the lid in which it is embedded; as can be seen in the figure, on the inner surface of the lid, there is a continuous raised line following the same contour as the high part of the recipient and which will serve for welding the inner lid with the recipient by heat-sealing, ultrasounds or any other welding method; small triangular protrusions can also be seen which will serve for positioning the lid on the recipient and in this manner ensuring its hermetic closure on the entire contour.

Figure 5:
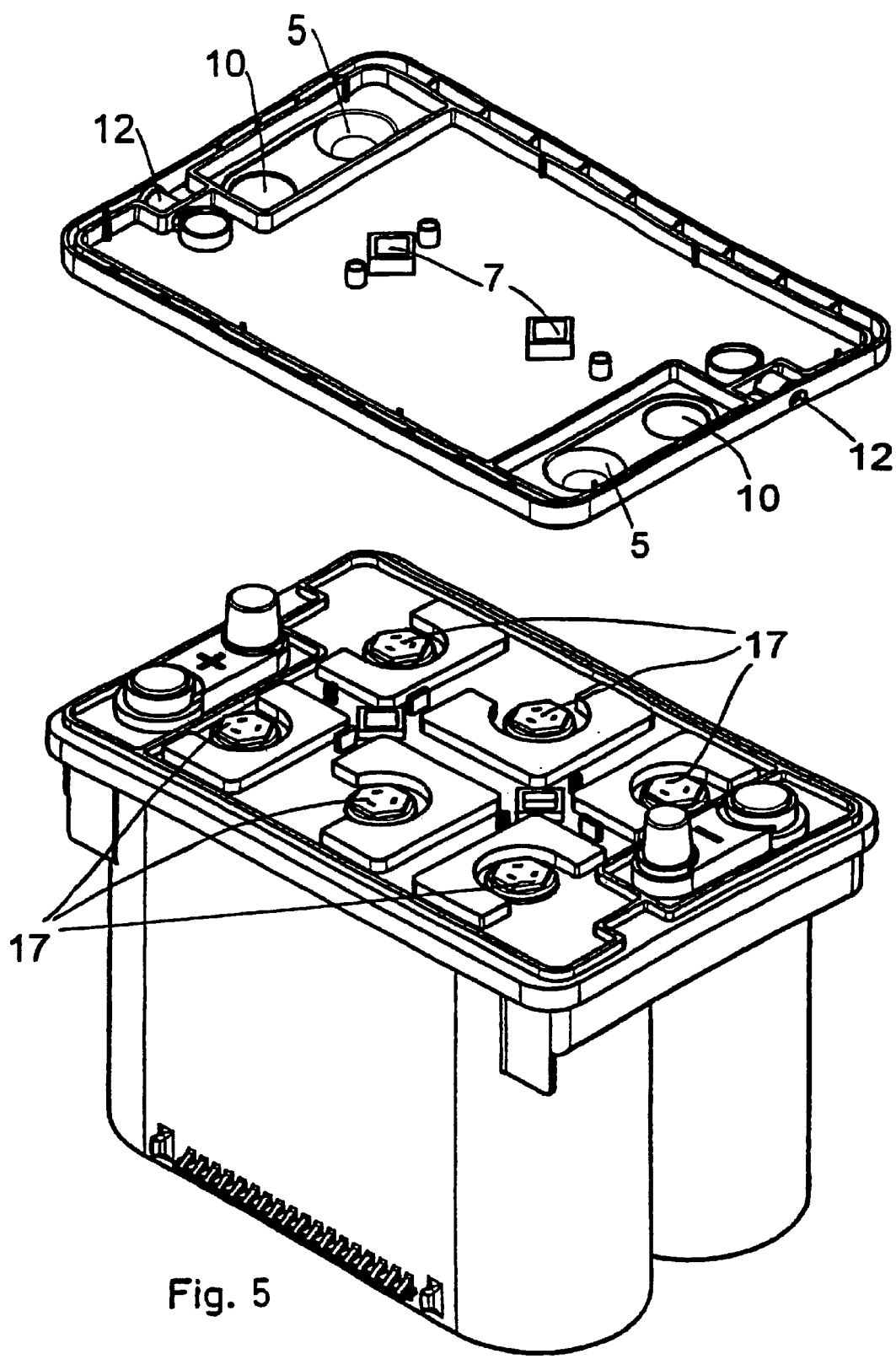
FIG. 5 shows a view similar to FIG. 1, with the separated upper lid.
Figure 6:
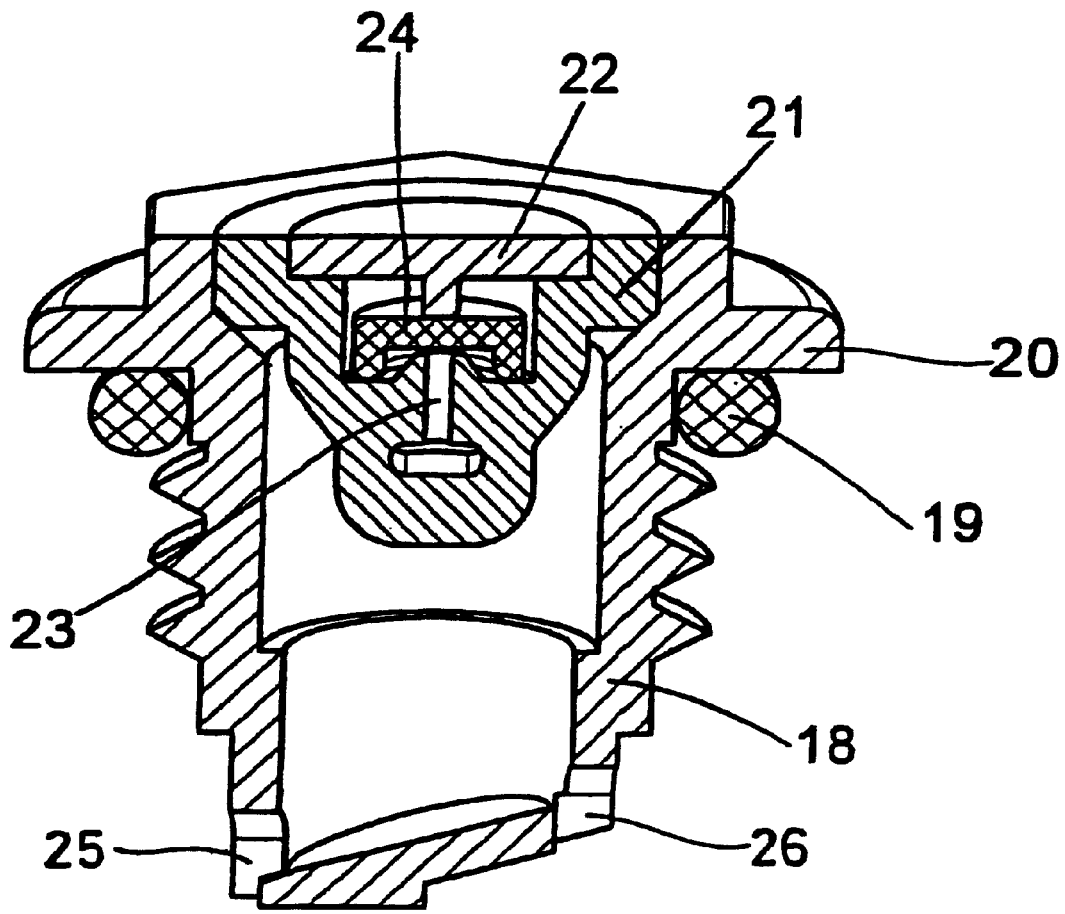
FIG. 6 shows a diametric sectional view of the stopper.

FIG. 5 shows the battery with the outer lid seen from the inner surface, for the purpose of observing in detail the hermetically sealed closing system of both lids, except the two outlets through the holes marked with 12; the inner lid already incorporates the stoppers marked with number 17; on the surface of these stoppers, small perforated slots can be seen which would permit the gas passing through it when it leaves each one of the cells; the stoppers are screwed with a tightening torque ensuring the hermetic seal of the periphery and all the possible gases released by each cell must exit only through the previously mentioned perforated slots; on the visible surface of the inner lid, an overraised contour can be distinguished which will serve for welding by heat-sealing, ultrasounds or by any other method permitting the hermetic closure of both lids; in order to ensure the positioning of the outer lid on the battery, several protrusions have been arranged which guide the two parts to be welded and thus the hermetic seal of the weld is made reliable.

FIGS. 6 to 10 show the stopper marked with number 17 in FIG. 5; number 18 shows the outer threaded body of the stopper; this body is hollow and has two holes 25 and 26 in the lower part in order to permit the entrance of gas to the body 18; number 19 shows the section of the rubber toridal gasket for the hermetic closure of the body 18 onto the inner lid of FIG. 3; number 20 shows the edge of the body 18 that the toroidal gasket 19 must tighten to the inner lid; number 21 shows the section of a special inner body, welded to the upper part of the body 18 by heat-sealing, ultrasounds or any other method, for the purpose of ensuring the hermetic seal against the outside and at the same time, the body 21 is hollow and slit in order to permit the evacuation of gases from the battery cells; number 22 shows a movable lid of the stopper 17 which is welded to the body 21 by heat-sealing, ultrasounds or any other method for the purpose of ensuring the valve 24 fixing; the surface of this movable lid has three slots in order to permit the passage of gas to the outside; number 23 shows the slot permitting the passage of gas through a hollow body 21 towards the valve 24; lastly, number 24 shows the gas outlet valve which is of an elastic material and resistant to rust and the sulfuric acid etching; this valve is housed between a protrusion of the body 21 and the movable lid 22.

FIGS. 7 and 8 show in detail the holes labeled with numbers 25 and 26 through which the gas passes from the cell to the inside of the threaded body 18; in this figure, both the toroidal gasket 19 and the resilient valve 24 are shown in detail; this valve 24 is a cylinder with one of the bases closed, having the feature of expanding and letting the gas exit when the latter exerts pressure on the cylinder 24 walls; the gas pushes the valve 24 walls and it opens and permits its outward exit; but when the internal pressure is not high enough to expand the valve walls, it remains adhered to the protrusion of the body 21 and to the movable lid 22 and thus prevents the entrance of atmospheric air towards the inside of the cell; in this figure, it can be seen in detail how the valve 24 is housed and immobilized between the hollow body 21 and the movable lid 22 in an area where the only possibility it has is that of laterally expanding when the gas pressure is greater than that of the valve opening and recovers its position, closing the passage of gas when the internal pressure becomes that of the valve closing.

What is claimed is:

1. An electric accumulator battery, comprising a recipient, the recipient including walls and partitions, the recipient being internally subdivided into cells in which positive and negative toroidal plates are housed, between which a micro-fiberglass separator is arranged in which the electrolyte is embedded, the recipient is closed by means of a lid through which current tap terminals protrude and the lid has openings facing the cells which are closed by means of stoppers incorporating valves for controlling the gas outlet, characterized in that the lid closing the recipient is double and is composed of a lower lid and an upper lid joined together and delimiting an intermediate chamber; whose lower lid is hermetically sealed to the walls and partitions of the recipient, current outlet connections pass through the lower lid in a hermetically sealed manner, and the lower lid has a hole facing each cell, in which the corresponding closing stopper with a gas outlet valve is assembled, each stopper ends in the intermediate chamber and has ventilation openings facing ventilation passages of the recipient; and whose upper lid has openings for passing the current tap terminals, which are joined through connectors to said current outlet connections, the upper lid includes ventilation openings facing the ventilation openings of the lower lid, and one or two holes for the gas outlet; both lids having centering pins or protrusions on their facing surfaces, as well as walls encircling the ventilation openings and permitting the seal between the facing ventilation openings of the two lids.

2. A battery according to claim 1, characterized in that the separator arranged between plates for absorbing the electrolyte is composed of a mix of micro-fiberglass and a plastic material in a percentage of plastic micro-fibers comprised between 10% and 50% of the weight of the separator, said mixture of micro-fibers being arranged in a non-bundled manner, and with an addition of a siliceous material in proportions ranging from 0.01% to 1% of the total weight of the separator, defining particularly uniform pores of a maximum diameter of equal to or less than 22 microns.

3. A battery according to claim 2, characterized in that the gas outlet hole or holes are provided with a porous material through which exiting gas is forced to circulate for the purpose of it acting as a flame retardant system.

4. A battery according to claim 3 characterized in that the valves for the gas outlet of each cell are introduced within a stopper ensuring the minimum difference between opening pressure and closing pressure.

* * * * *

UNITED STATES PATENT AND TRADEMARK OFFICE
CERTIFICATE OF CORRECTION

PATENT NO. : 6,693,408 B2
DATED : February 17, 2004
INVENTOR(S) : Rafael Ruiz Rodriguez et al.

It is certified that error appears in the above-identified patent and that said Letters Patent is hereby corrected as shown below:

Title page,
Item [73], Assignee, replace the Assignee information "S.E. Acumulador Yudor, S.A., Madrid (ES)" with the correct Assignee: -- S.E. Acumulador Tudor, S.A., Madrid (ES) --.

Signed and Sealed this

Twenty-eighth Day of September, 2004

JON W. DUDAS
*Director of the United States Patent and Trademark Office*